United States Patent
Stanhope et al.

(10) Patent No.: US 7,056,966 B2
(45) Date of Patent: *Jun. 6, 2006

(54) LIQUID BENZOATE ESTER COMPOSITIONS AND AQUEOUS POLYMER COMPOSITIONS CONTAINING SAME AS PLASTICIZERS

(75) Inventors: Bruce Edward Stanhope, Grayslake, IL (US); William David Arendt, Libertyville, IL (US)

(73) Assignee: Velsicol Chemical Corporation, Rosemont, IL (US)

( * ) Notice: Subject to any disclaimer, the term of this patent is extended or adjusted under 35 U.S.C. 154(b) by 579 days.

This patent is subject to a terminal disclaimer.

(21) Appl. No.: 10/178,712

(22) Filed: Jun. 25, 2002

(65) Prior Publication Data

US 2003/0092808 A1    May 15, 2003

Related U.S. Application Data

(63) Continuation-in-part of application No. 09/945,493, filed on Aug. 30, 2001, now Pat. No. 6,583,207.

(51) Int. Cl.
*C08K 5/09*    (2006.01)

(52) U.S. Cl. .............. 524/290; 516/204; 524/291; 524/292

(58) Field of Classification Search ............ 524/290, 524/291, 292; 516/204
See application file for complete search history.

(56) References Cited

U.S. PATENT DOCUMENTS

| | | | | |
|---|---|---|---|---|
| 2,360,866 | A * | 10/1944 | Garvey | 524/113 |
| 2,752,319 | A * | 6/1956 | Lipke, Jr. et al. | 524/153 |
| 4,277,387 | A | 7/1981 | Jordan, Jr. et al. | 260/29.7 H |
| 5,006,585 | A | 4/1991 | DiBella | 524/293 |
| 5,532,300 | A | 7/1996 | Koubek et al. | 524/47 |
| 5,676,742 | A | 10/1997 | Arendt et al. | 106/15.05 |
| 5,990,214 | A | 11/1999 | Arendt et al. | 524/296 |
| 6,583,207 | B1 * | 6/2003 | Stanhope et al. | 524/291 |
| 2004/0132882 | A1 * | 7/2004 | Stanhope et al. | 524/297 |

* cited by examiner

*Primary Examiner*—Bernard Lipman
(74) *Attorney, Agent, or Firm*—Fitch, Even, Tabin & Flannery

(57) ABSTRACT

The addition of at least 20 weight percent of at least one member of a specified class of monobenzoates to at least one member of a specified class of dibenzoates that freeze at 28° C. or above results in a mixture that is both a liquid at this temperature and an unexpectedly effective plasticizer for many organic polymers. The plasticized polymer compositions are useful in various end use applications including adhesives and caulks.

17 Claims, No Drawings

LIQUID BENZOATE ESTER COMPOSITIONS AND AQUEOUS POLYMER COMPOSITIONS CONTAINING SAME AS PLASTICIZERS

RELATED COPENDING APPLICATIONS

This application is a continuation-in-part of U.S. patent application Ser. No. 09/945,493, filed Aug. 30, 2001 U.S. Pat. No. 6,583,207.

BACKGROUND OF THE INVENTION

This invention relates to liquid ester compositions. More particularly, this invention relates to mixtures comprising a defined class of diesters derived from a dialkylene glycol and benzoic acid or a substituted benzoic acid and a defined class of monoesters derived from at least one dialkylene glycol or other dihydric alcohol and the same acid. The weight ratio of monoester to diester in the present compositions is sufficient to cause the compositions to be liquids at 28° C. All of the present diesters are solids at this temperature.

The liquid ester compositions of the present invention are particularly suitable plasticizers for aqueous and non-aqueous polymer compositions useful as adhesives.

DESCRIPTION OF THE PRIOR ART

Mono- and diesters derived from benzoic acid and dialkylene glycols such as diethylene glycol and dipropylene glycol are known compounds. The use of these diesters alone and in combination with limited amounts of the corresponding monoesters as plasticizers for aqueous polymer compositions is described in the prior art. As an example of the latter, U.S. Pat. No. 5,676,742, which issued to William Arendt on Oct. 14, 1997 describes plasticized aqueous polymer compositions useful as latex caulks. The primary plasticizer in these compositions is a diester derived from benzoic acid and diethylene and/or dipropylene glycol. Both hydroxyl groups of the diol are esterified.

In accordance with the teaching of the aforementioned patent to Arendt, a shortcoming of caulks formed from aqueous polymer compositions containing dibenzoates of diethylene- and/or dipropylene glycol as plasticizers is the greater susceptibility of the final caulk to fungal attack relative to caulks prepared using the same polymer composition and a diester of phthalic acid such as butylbenzyl phthalate as the plasticizer.

The Arendt patent teaches that even though monoesters of glycols are not considered effective plasticizers for certain applications, relatively low levels of diethylene glycol (DEG) monobenzoate and/or dipropylene glycol (DPG) monobenzoate in combination with the corresponding dibenzoate as the primary plasticizer were sufficient to improve the fungal resistance exhibited by the caulks relative to the resistance imparted by dibenzoate plasticizers alone without any substantial adverse effect on the processability of the polymer compositions.

Throughout this patent the concentrations of the glycol or diol monobenzoates in blends containing the corresponding dibenzoates are expressed in terms of a "hydroxyl number". The units for the "hydroxyl number" are understood by those skilled in the art to be milligrams of potassium hydroxide per gram of sample.

The relationship between the "hydroxyl number" and the relative concentration of monobenzoate in a monobenzoate/dibenzoate blend will be explained in greater detail in a subsequent section of this specification.

The hydroxyl numbers exhibited by the mixtures of diethylene glycol mono- and dibenzoates disclosed in the Arendt patent range from 12.1 to 58.4. This is equivalent to a concentration of diethylene glycol monobenzoate in the mixture of from 4 to 18 weight percent.

It is understood by those skilled in the art that to be effective, a water-insoluble plasticizer should be absorbed by the particles of polymer present in an aqueous emulsion of the polymer. This absorption typically results in an increase in viscosity of the polymer composition. Data in Table 6 of the aforementioned Arendt patent demonstrate significantly less of an increase in viscosity with increasing plasticizer concentration as the hydroxyl number of the plasticizer is increased, which is equivalent to an increased concentration of the corresponding monobenzoate in a monobenzoate/dibenzoate blend. One skilled in the art of polymer chemistry would conclude from these data that the monobenzoates of diethylene and dipropylene glycols are not effective plasticizers for the aqueous polymer compositions described in the patent and would not employ these monobenzoates as plasticizers in aqueous polymer compositions unless improved fungal resistance was a requirement for the final product.

The use of the monobenzoate of 2,2,4-trimethyl-1,4-pentanediol as a plasticizer for polyvinyl chloride is described in U.S. Pat. No. 5,006,585, which issued to DiBella on Apr. 9, 1991. Because polyvinyl chloride is processed as a molten material, any adverse effect of the plasticizer on the viscosity or processability of aqueous polymer dispersions is not a consideration. The only criterion for the melting point of the plasticizer is that it be below the melting point of polyvinyl chloride.

The present invention is based on the following unexpected findings.

1. The addition of a minimum of about 20 weight percent of a monobenzoate of a specified class of diols and glycols to a dibenzoate of these diols and glycols that is a solid at 28° C., results in a mixture that is a liquid at this temperature. Liquid plasticizers are advantageous relative to solid ones because liquids are easier to transport and blend. They also eliminate the need to heat aqueous polymer compositions during or following addition of the plasticizer to ensure uniform distribution of plasticizer throughout the polymer composition and absorption of the plasticizer by the emulsified polymer particles.

2. The reduction in plasticizer efficacy with increasing monobenzoate concentration that is demonstrated by the data in the aforementioned Arendt patent is not observed when the concentration of monobenzoate is increased beyond the limits taught in this patent. Preferred compositions exhibit an increase in viscosity at least equivalent to that achieved using diethylene gylcol dibenzoate as the sole plasticizer.

U.S. Pat. No. 5,990,214, issued on Nov. 23, 1999 to Arendt et al. discloses mixtures comprising the dibenzoates of DEG and triethylene glycol. These blends exhibit a eutectic freezing point that is below the freezing point of either component diester. No monobenzoates of these glycols are disclosed or suggested in this patent as required or optional plasticizers.

SUMMARY OF THE INVENTION

The present invention provides liquid ester compositions comprising:
  at least one monoester represented by the formula HXC(O)$R^1$ and
  at least one diester represented by the formula $R^1$(O)CYC(O)$R^1$,
wherein X and Y are individually selected from the group consisting of
—[OCH$_2$CH$_2$]$_n$O—, and —O$R^2$O—,
said diester is a solid at 28° C.,
$R^1$ is phenyl or substituted phenyl,
$R^2$ is selected from the group consisting of linear alkylene containing 3 or 4 carbon atoms, —CH$_2$CH(CH$_3$)CH$_2$— and —CH$_2$C(CH$_3$)$_2$CH$_2$—;
n is 1, 2 or 3,
and
wherein said composition is a liquid at 28° C.

The concentration of monobenzoate required to yield a liquid composition is typically at least about 20 weight percent of the mono-/dibenzoate mixture. The present compositions can contain up to 99 weight percent of the present monobenzoates.

This invention also provides plasticized polymer compositions wherein the polymer is selected from the group consisting of 1) polymerized vinyl esters including but not limited to polyvinyl acetate, and copolymers of said esters with at least one olefin such as ethylene and 2) polymerized esters of ethylenically unsaturated carboxylic acids such as acrylic and methacrylic acids, including copolymers of these esters with olefins such as ethylene and styrene, and 3) condensation polymers such as polyesters and polyamides. The plasticizer comprises a liquid benzoic acid ester composition of the present invention.

DETAILED DESCRIPTION OF THE INVENTION

The Dibenzoate Ingredient

The dibenzoates present in the liquid ester compositions of this invention include
(1) the dibenzoates of ethylene glycol, diethylene glycol or triethylene glycol, the ester being represented by the formula $R^1$(O)C[OCH$_2$CH$_2$]$_n$OC(O)$R^1$ and/or
(2) the dibenzoates of certain diols, the ester being represented by a formula $R^1$(O)CO$R^2$OC(O)$R^1$.

When the mono- and/or dibenzoate is derived from a diol, this diol can be at least one of 1,3-propanediol; 1,4-butanediol; 2-methyl-1,3-propanediol; and neopentyl glycol (2,2-dimethyl-1,3-propanediol).

The Monobenzoate Ingredient

The monobenzoates suitable for use in the compositions of the present invention are represented by the general formulae H[OCH$_2$CH$_2$]$_n$OC(O)$R^1$ and HO$R^2$OC(O)$R^1$.

In the general formulae of the present mono-and dibenzoates, $R^1$ represents phenyl or substituted phenyl, $R^2$ is selected from the group consisting of linear alkylene radicals containing 3 or 4 carbon atoms, —CH$_2$CH(CH$_3$)CH$_2$— and —CH$_2$C(CH$_3$)$_2$CH$_2$—; and n is 1, 2 or 3.

In preferred compositions of the present invention the dibenzoate and at least a portion of the monobenzoate are derived from diethylene glycol, hereinafter referred to as DEG or 2-methyl-1,3-propanediol, hereinafter referred to as MPD. Other mono- and dibenzoates of the present invention can also be present.

Preparation of the Present Ester Compositions

One embodiment of the present mono-/diester blends wherein both the diester and at least a portion of the monoester are derived from the same dihydric alcohol can be prepared using a traditional esterification reaction using 1) benzoic acid, a substituted benzoic acid or the corresponding acid halide and 2) the desired dihydric alcohol as reactants. Alternatively, other known reactions such as transesterification using a benzoate ester in place of benzoic acid can be used to prepare the diester.

Depending upon the molar ratio of mono- to dibenzoate desired in the final product, the molar ratio of the acid or acid halide to the dihydric alcohol in the initial reaction mixture is typically from 1:1 to about 1.7:1, and the reaction is continued until substantially all of the initial acid has reacted.

When at least one of the monoesters in the present compositions is not derived from the same dihydric alcohol(s) as the diester(s), the monoester is prepared separately and then combined with the diester.

It should be apparent to those skilled in the art that when it is desired to remove at least a portion of the monoester from a product mixture with the corresponding diester, this can be accomplished using distillation or other purification technique.

Benzoic acids suitable for use in preparing the mono- and diesters of the present compositions can be represented by the general formula HO(O)CAr, wherein Ar represents an unsubstituted or substituted phenyl radical. Substituents that can be present on the phenyl radical include but are not limited to alkyl radicals containing from 1 to about 4 carbon atoms and halogen atoms. Examples of substituted benzoic acids include but are not limited to ortho-, meta-, and para-toluic acid and the various halogenated benzoic acids such as o-chlorobenzoic acid.

The preference for unsubstituted benzoic acid as a reactant for preparing both the dibenzoate and monobenzoate esters of the present compositions is based on the cost and availability of this compound.

The Dihydric Alcohol

Dihydric alcohols suitable for preparing the present ester compositions include ethylene glycol, diethylene glycol, triethylene glycol, 1,3-propanediol, 1,4-butanediol, 2-methyl-1,3-propanediol, and neopentyl glycol. The dibenzoates of all of these dihydric alcohols melt at 28° C. or above.

Minimum Monobenzoate Concentrations for Liquid Compositions

While the present dibenzoates are effective plasticizers for aqueous organic polymer compositions, a disadvantage of these dibenzoates as the sole plasticizer for aqueous polymer compositions processed at ambient temperature is that the melting points of these diesters are at least 28° C. This becomes an issue when it is desired to transport the plasticizer and blend it with an organic polymer under ambient conditions. The preferred dibenzoates of diethylene glycol (DEG) and 2-methyl-1,3-propanediol (MPD) melt at 28° C. and 43° C., respectively. The corresponding monobenzoates of these and other dihydric alcohols of the present invention melt below 28° C., however the prior art, including the aforementioned patent to Arendt, suggests that these monobenzoates are not useful plasticizers relative to the corresponding dibenzoates because the monobenzoates were considered less compatible than the corresponding dibenzoates with aqueous emulsions containing acrylic and/or vinyl ester polymers.

The present invention is based on the discovery that the present dibenzoate/monobenzoate mixtures are not only liquids at ambient temperature, but, in many instances, are equally effective plasticizers for many aqueous polymer emulsions as the corresponding dibenzoate used alone. For this reason the preferred monobenzoate(s) can constitute up to 99 percent of the present ester compositions.

The concentration of monobenzoate required to achieve a blend with the corresponding dibenzoate that is a liquid at 28° C. and the efficacy of these blends as plasticizers for aqueous polymer compositions are not suggested in the prior art relating to benzoate esters as plasticizers.

When the monobenzoate is diethylene glycol (DEG) monobenzoate, a minimum monobenzoate concentration of about 34 weight percent in a blend with DEG dibenzoate is required to obtain a blend that is a liquid at 12° C. Pure DEG monobenzoate exhibits a hydroxyl number of 264 and melting point below −25° C.

Methods for determining the relative concentration of monobenzoate in a mixture containing the mono- and dibenzoates of a dihydric alcohol include but are not limited to gas/liquid chromatography and measuring the hydroxyl number of the mixture.

The procedure for determining the hydroxyl number of a compound or a mixture is described in ASTM test procedure E222, method B.

For example, pure DEG dibenzoate contains no unreacted hydroxyl groups, and therefore exhibit a hydroxyl number of 0. Knowing the hydroxyl number for a particular monobenzoate/dibenzoate blend, the relative concentration of monobenzoate in the blend can readily be calculated or obtained from a curve of hydroxyl number vs. weight percent monobenzoate for the particular ester pair.

The hydroxyl numbers for the DEG monobenzoate/dibenzoate blends exemplified in the aforementioned patent to Arendt range from 12.1 to 58.4. This is equivalent to a DEG monobenzoate concentration in the blend of from about 4 to about 18 weight percent.

Optional Ester Ingredients

In addition to the monobenzoate/dibenzoate mixtures described hereinbefore, the present ester compositions can include up to 70 weight percent of dipropylene glycol (DPG) dibenzoate alone or mixtures of DPG mono- and dibenzoates to enhance the desirable properties of the ester compositions, particularly lowering their freezing point. DPG dibenzoate freezes at 28° C. The presence of DPG mono-and dibenzoates will also depress the freezing point of blends containing DEG mono- and dibenzoates.

Polymer Compositions Suitable for Use with the Present Plasticizers

Preferred classes of monomers used to prepare aqueous polymer compositions suitable for use with the present liquid ester compositions as plasticizers include but are not limited to 1) vinyl esters such as vinyl acetate and copolymers of these esters with olefins such as ethylene, 2) esters derived from ethylenically unsaturated acids, such as acrylic and methacrylic acids, and mono- or polyhydric alcohols, 3) condensation polymers such as polyesters and polyamides, and 4) copolymers derived from ethylenically unsaturated acids or their esters and ethylenically unsaturated hydrocarbons such as ethylene and styrene.

Because they are liquid at 25° C., the liquid ester compositions of this invention are particularly suitable for use with aqueous polymer dispersions or emulsions. These aqueous polymer compositions are useful in numerous end-use applications, including but not limited to adhesives, caulks, coatings, inks, overprint varnishes and floor polishes for a variety of applications.

In addition to aqueous dispersions and emulsions of polymers, the present liquid ester composition are suitable for use with other forms of polymers, including but not limited to solutions and dispersions of the polymers in organic liquids such as methanol and solids that are processed as molten materials.

The polymer selected will be determined at least in part by the intended end use of the polymer composition. Polymers of vinyl esters such as vinyl acetate and copolymers of these esters with olefins such as ethylene or with esters of acrylic or methacrylic acid are preferred materials for adhesives.

The aforementioned patent to Arendt relating to the dibenzoates of DEG and DPG as plasticizers in combination with small amounts of the corresponding monobenzoate discloses aqueous dispersions of acrylic polymers useful as latex caulks.

The accompanying examples demonstrate the improved level of desirable properties such as increased open time that can be achieved. Open time is defined as the maximum time interval following application of an adhesive layer to a surface during which the layer will bond to a surface placed in contact with the adhesive. The increase in open time is typically achieved with no change or a decrease in set time. Set time is defined as the minimum time period required for an adhesive to bond to a surface in contact with the adhesive. The addition of a plasticizer to an adhesive comprising a dispersed polymer generally maintains or decreases the set time of the adhesive.

EXAMPLES

The compositions described in the following examples represent preferred embodiments of the present invention and should not be interpreted as limiting the invention defined in the accompanying claims. Unless otherwise specified all parts and percentages are by weight and all measurements and analyses were conducted under ambient conditions.

Example 1

This example describes the preparation of the present benzoate ester blends using diethylene glycol as the dihydric alcohol.

The hydroxyl number of the final ester products prepared, together with the calculated weight percent of diethylene glycol monobenzoate (DEGMB) corresponding to these values and the state of the final ester (liquid or solid) at ambient temperature (23–25° C.), are also recorded in Table 1.

TABLE 1

Preparation of Diethylene Glycol Monobenzoate (DEGMB)/Dibenzoate Mixtures

| Plasticizer | BA:DEG Ratio | OH No. | Wt % DEGMB | State @ Ambient Temperature |
|---|---|---|---|---|
| A[a] | 2:1 | 11.9 | 3 | Solid |
| B | 1.4:1 | 103 | 35 | Liquid |
| C | 1:4 | 261 | 95 | Liquid |

[a]prior art composition evaluated for comparative purposes

The ester mixtures exemplified in the following examples were prepared using the same general method used to prepare the diethylene glycol esters.

Example 2

This example demonstrates the difference in initial freezing temperature between samples of diethylene glycol dibenzoate containing the corresponding monobenzoate alone or in combination with the monobenzoate of dipropylene glycol.

The initial freezing temperatures of the ester mixtures were determined by placing a ten-gram sample of the mixture into a 4-dram vial. The vial was then immersed in a water bath maintained at a temperature of 16° C. The sample was then seeded with a particle of DEG dibenzoate containing 4 percent of DEG monobenzoate. This ester mixture is a solid at 28° C. The temperature of the water bath was then lowered in increments of 2° C. The temperature of the liquid in the vials was allowed to stabilize and maintained for 24 hours prior to each reduction in bath temperature.

The temperature at which the first evidence of solid material other than the seed particle was observed was recorded as the initial freezing temperature.

The test samples were prepared by combining an esterification reaction product prepared as described in Example 1 and containing 95 percent diethylene glycol dibenzoate (DEG dibenzoate) and 4 percent diethylene glycol monobenzoate (DEG monobenzoate) with one of the following ester compositions identified as A, B, and C.

(A) An esterification reaction product containing 5 percent DEG dibenzoate and 94 percent of DEG monobenzoate. The quantity of A was sufficient to achieve a total concentration of DEG monobenzoate listed in Table 2.

(B) three mixtures containing the esterification reaction product (A) and an esterification reaction product (C) of dipropylene glycol (DPG) and benzoic acid containing 5 percent (DPG) dibenzoate and 95 percent DPG monobenzoate.

The concentration of total monobenzoate in all of the ester mixtures (B) evaluated was nominally 34 weight percent, and DPG monobenzoate in these mixtures constituted 10, 20 or 30 percent of the total monobenzoate;

(C) a mixture of esterification reaction (A) and an esterification reaction product of benzoic acid and 2-methyl-1,3-propanediol (MPD) containing 93 percent of MPD monobenzoate. MPD monobenzoate constituted 10 percent of the total monobenzoate listed in Table 2.

The reaction product containing 4 percent of DEG monobenzoate was used as a control.

The concentration of monobenzoate(s) in the samples together with the initial freezing temperature of the samples are recorded in Table 2.

TABLE 2

| Sample No. | % DEGDB | % DEGMB | % DPGMB | % MPDMB | Initial Freezing Temperature |
|---|---|---|---|---|---|
| 1 | 66 | 33 | 0 | 0 | 14 |
| 2 | 63 | 29 | 7 | 0 | 10 |
| 3 | 66 | 26 | 7 | 0 | 12 |
| 4 | 67 | 24 | 8 | 0 | 12 |
| 5 | 63 | 31 | 0 | 5 | 12 |

MB = monobenzoate
DB = dibenzoate

Example 3

Mixtures containing benzoic acid, 2,2 dimethyl-1,3-propanediol (MPD) and 0.25 weight percent, based on this mixture, of zirconuim carbonate as a catalyst were heated at temperatures within the range of from 170 to 250° C. in a reactor equipped with heating means, a mechanical stirrer, water-cooled condenser, and a trap for collecting the condensed water formed as a by-product of the esterification reaction. The molar ratio of benzoic acid to (BA:MPD Ratio) used in the preparations are recorded in Table 1. The vaporized water formed as a by-product of the reaction was condensed and removed from the reaction mixture using the trap.

The progress of the esterification reaction was monitored by periodically measuring both the acid content of the reaction mixture and the volume of condensed water collected in the trap. The reaction was discontinued when the concentration of benzoic acid was about 0.1 weight percent.

The reaction product contained 94 percent MPD dibenzoate and 2 percent MPD monobenzoate. This reaction product was then combined with three different amounts of an esterification reaction product containing 7 percent MPD dibenzoate and 93 percent MPD monobenzoate to achieve the total monobenzoate concentrations listed in Table 3, which also contains the initial freezing temperatures of the resultant mixtures.

TABLE 3

| Sample No. | % MPD Dibenzoate | % MPD Monobenzoate | Initial Freezing Temperature (° C.) |
|---|---|---|---|
| 6 | 69 | 30 | <15 |
| 7 | 66 | 33 | <15 |
| 8 | 64 | 35 | <15 |

Example 4

This example demonstrates the performance of preferred ester compositions of the present invention as plasticizers for aqueous adhesive compositions containing polyvinyl and an ethylene/vinyl acetate copolymer.

The polymer compositions evaluated were an aqueous emulsion containing 55 weight of polyvinyl acetate, available as Vinac® XX-230 from Air Products and Chemicals (I), and 2) an aqueous emulsion containing 55 weight percent of an ethylene/vinyl acetate copolymer, available as Airflex® 400 from Air Products and Chemicals (II). plasticized polymer compositions were prepared by blending ester composition 4 of the proceding Example 1 or 7 of Example 2 with one of the two preceding aqueous polymer emulsions (I or II) using a propeller-type mixer with a blade speed of 750 RPM. The time was 10 minutes. The concentrations of plasticizer were 6, 12 and 18 weight percent, based on total emulsion weight for both emulsions.

The viscosities of the polymer compositions were measured to evaluate the efficacy of the ester compositions as plasticizers. These viscosity values are recorded in Table 4. The effect of the plasticizers on the open and set times of the adhesive compositions was also determined.

As used in this specification, "open time" refers to the time interval during which the exposed surface of the adhesive under evaluation remains sufficiently "tacky" to achieve substrate failure, as evidenced by removal of fibrous material from mating surfaces of sheets of Kraft paper which had been bonded under medium pressure using the adhesive being evaluated.

The term "set time" refers to the minimum time interval between 1) application of the adhesive on the surface of one substrate followed by immediate contact with the second substrate under medium pressure, and 2) achievement of complete substrate failure of the bonded surfaces of the Kraft paper.

The viscosity of each plasticized polymer composition was measured under ambient conditions using a Brookfield Model RVT viscometer. The spindle speed was 20 RPM Measurements were made 24 hours following preparation of the compositions. The results of the viscosity measurements are recorded in Table 4. The emulsions and plasticizers are identified as described in the preceding specification and the concentration of plasticizer was 18 weight percent, based on the total weight of the plasticized emulsion.

TABLE 4

Viscosity of Aqueous Polymer Emulsions

| Polymer Emulsion[b] | Plasticizer Type[c] | Viscosity (mPa · s) |
|---|---|---|
| I | A[a] | 4700 |
| I | 1 | 5500 |
| I | 4 | 6400 |
| I | 7 | 5300 |
| I | None | 1700 |
| II | A[a] | 32000 |
| II | 1 | 26000 |
| II | 4 | 26500 |
| II | 7 | 40000 |
| II | None | 1500 |

[a]Sample A from Example 1; evaluated for comparative purposes only.
[b]based on weight of emulsion
[c]Sample numbers from preceding tables 2 and 3

The data in Table 4 demonstrate that the viscosity imparted to an aqueous polymer emulsion by diethylene glycol dibenzoate alone is not adversely affected by the presence of the corresponding monobenzoate. In many instances the viscosity of the emulsion is substantially increased, indicating absorption of the monobenzoate plasticizer by the emulsified polymer particles.

Determination of Open Time

Fifty pound weight Kraft paper that had previously been stored for at least 24 hours at ambient temperature and humidity was cut into strips measuring 1.5 by 12 inches (3.7 by 30.5 cm.) and 1 by 12 inches (2.5 by 30.5 cm.). One of the 1 inch-wide strips, hereinafter referred to as the "narrow strip", was centered on top of one of the 1.5 inch-wide strips, hereinafter referred to as the "wide strip" and the two strips were clamped together at one end. The narrower strip was then pulled away from the wider one at an angle of about 180 degrees, and a #14 wire-wound Meyers rod was placed on the upper surface of the narrower strip at the clamping point. The narrow strip was then laid over this Meyers rod. A second Meyers rod without a wire winding and exhibiting the same diameter as the #14 wire-wound rod was then secured behind the wire-wound rod and in contact with what was originally the lower surface of the narrow strip of paper. The two rods were separated by the narrow paper strip, with the non-wound rod in contact with the lower surface of the narrow strip and the wire-wound rod in contact with both the upper surface of the wide strip and the lower surface of the narrow strip. The purpose of the wireless rod was to prevent the narrow strip from returning to its original position on top of the wider one prior to application of the adhesive.

About 3 grams of the adhesive to be evaluated were deposited on the exposed surface of the wide strip adjacent to the clamp and applied as a continuous coating on this strip using a #16 wire-wound Meyers rod moving from the secured end to the unsecured end of the wide strip, leaving a small uncoated area at the free end of this strip. A stop watch was started following completion of the adhesive application.

When the time interval to be evaluated as open time had elapsed, the two #14 rods, separated by the narrow strip, were brought together. The resultant assembly was then pulled as a single unit to the free end of the wide strip over a 2-second interval and under moderate pressure. This operation resulted in the lower surface of the narrow paper strip contacting and becoming bonded to the adhesive layer. Following a ten-second interval the two strips were pulled apart by grasping them at the uncoated areas. If 80 to 100 percent of failure occurred on the substrate, as evidenced by the transfer of fibrous material from the narrow paper strip to the adhesive layer, the adhesive is still considered "open", i.e. capable of adhering the two strips of paper together.

Once a bonded pair of strips exhibiting substrate failure had been prepared, additional pairs of strips were assembled, coated and bonded. The time interval between application of the adhesive and contact between the wide and narrow strips was increased in five second intervals until no fibrous material was observed in the adhesive layer when the strips were pulled apart. The presence of fibrous material on the adhesive is indicative of at least partial substrate failure. In subsequent tests the initial time interval of five seconds between the observations of partial and no substrate failure for a given sample was decreased until the actual time interval between application of the adhesive and the observation of adhesion loss, i.e. no substrate failure, could be determined to the nearest second. This value was recorded as the "open time".

Determination of Set Time

Set time was measured using the same test samples and equipment described in the preceding test for measuring open time. In this instance the adhesive was applied over the exposed surface of the wider strip using the #16 wire-wound Meyers rod, starting near the clamp used to join the narrow and wide sheets of paper. The #14 wire-wound Meyers rod was located directly behind the #16 wire-wound rod and on the opposite side of the narrower strip of paper, which separated the two rods. A layer of the adhesive to be evaluated followed by the narrow strip of paper was applied to the wider strip by pulling both rods, together with the narrow strip of paper between them, over the wide sheet as described in the preceding section of this example.

A stopwatch was started following application of the adhesive and the narrow paper strip. This time the bonded paper layers were pulled apart at a rate that required 30 seconds to traverse the length of the sample being evaluated. The angle between the paper strips during pulling was about 180°.

While the paper strips were being pulled apart, the mating surfaces of the strips were examined to determine the percentage of fibers that were at least partially torn from either paper strip and became bonded to the adhesive. The "set time" is the shortest time interval, measured from contact between the narrow and wide paper strips, required to achieve from 80% to 100% fiber tear in the paper strips, considered complete substrate failure.

The results of the open time and set time evaluations are recorded in the following Table 5.

TABLE 5

Set and Open Times for Plasticizers

| Polymer Emulsion | Plasticizer Type[b] | Set Time (Sec.) @ Concentration (%) | | | Open Time (Sec.) @ Concentration (%) | | |
|---|---|---|---|---|---|---|---|
| | | 6 | 12 | 18 | 6 | 12 | 18 |
| I | A[a] | 7 | 5 | 4 | 5 | 5 | 15 |
| I | 1 | 8 | 6 | 4 | 5 | 15 | 25 |
| I | 4 | 5 | 5 | 4 | 5 | 20 | 25 |
| I | 7 | 6 | 5 | 4 | 5 | 10 | 20 |
| I | None[a] | 10 | 10 | 10 | ND | ND | ND |
| II | A[a] | 5 | 5 | 5 | 20 | 20 | 20 |
| II | 1 | 6 | 6 | 7 | 20 | 15 | 20 |
| II | 4 | 7 | 4 | 4 | 20 | 20 | 20 |
| II | 7 | 6 | 5 | 5 | 15 | 20 | 20 |
| II | None[a] | 9 | 9 | 9 | 5 | 5 | 5 |

[a]evaluated for comparative purposes
[b]Sample numbers from preceding tables 2 and 3
ND = Value not determined The data in Table 5 demonstrate that the presence of diethylene glycol monobenzoate in a blend with diethylene glycol dibenzoate does not adversely affect desirable properties, such as set time and open time, of the adhesive. In some instances open time is increased and set time is maintained or improved. These data also demonstrate that plasticizers wherein the monobenzoates of DPG or MPD at least partially replace DEG in blends of DEG mono- and dibenzoates exhibit effective performance.

That which is claimed is:

1. A liquid ester composition comprising:
   at least one monoester represented by the formula HXC(O)R$^1$ and at least one diester represented by the formula R$^1$(O)CYC(O)R$^1$,
   wherein X and Y are individually selected from the group consisting of —[OCH$_2$CH$_2$]$_n$O, and —OR$^2$O—,
   said diester is a solid at 28° C.,
   R$^1$ is phenyl or substituted phenyl, wherein the substituent is selected from the group consisting of alkyl radicals containing from 1 to 4 carbon atoms and halogen,
   R$^2$ is selected from the group consisting of linear alkylene containing 3 or 4 carbon atoms, —CH$_2$CH(CH$_3$)CH$_2$— and —CH$_2$C(CH$_3$)$_2$CH$_2$—;
   n is 1, 2 or 3, and
   wherein said composition is a liquid at 28° C.

2. A composition according to claim 1 wherein the combined concentration of all monoesters is at least 20 weight percent of said ester composition.

3. A composition according to claim 2 wherein said monoesters constitute from 20 to 99 weight percent of said ester composition.

4. A composition according to claim 1 wherein X and a portion of Y are identical and are selected from the group consisting of —OCH$_2$CH$_2$OCH$_2$CH$_2$O— and —OCH$_2$CH(CH$_3$)CH$_2$O—.

5. A composition according to claim 4 wherein X and Y are —O(CH$_2$CH$_2$O)$_n$— and said composition additionally comprises a mixture of the mono- and dibenzoates of dipropylene glycol.

6. A composition according to claim 1 wherein both X and Y are —OCH$_2$CH(CH$_3$)CH$_2$O—.

7. A composition according to claim 1 wherein R$^1$ is phenyl.

8. A polymer composition comprising
   A. an organic polymer and
   B. an amount sufficient to plasticize said polymer of an ester composition that is a liquid at 28° C. and comprises:
   at least one monoester represented by the formula HXC(O)R$^1$ and at least one diester represented by the formula R$^1$(O)CYC(O)R$^1$,
   wherein X and Y are individually selected from the group consisting of —[OCH$_2$CH$_2$]$_n$O and —OR$^2$O—,
   said diester is a solid at 28° C.,
   R$^1$ is phenyl or substituted phenyl, wherein the substituent is selected from the group consisting of alkyl radicals containing from 1 to 4 carbon atoms and halogen,
   R$^2$ is selected from the group consisting of linear alkylene containing 3 or 4 carbon atoms, —CH$_2$CH(CH$_3$)CH$_2$— and —CH$_2$C(CH$_3$)$_2$CH$_2$—;
   n is 1, 2or 3, and wherein said composition is a liquid at 28° C.

9. A polymer composition according to claim 8 wherein said organic polymer is selected from the group consisting of homopolymers of vinyl esters and copolymers of these esters with olefins, esters derived from ethylenically unsaturated acids and mono- or polyhydric alcohols, polyesters, polyamides and copolymers derived from ethylenically unsaturated acids or esters thereof and ethylenically unsaturated hydrocarbons.

10. A composition according to claim 9 wherein the combined concentration of all monoesters is at least 20 weight percent, based on the total weight of said ester composition.

11. A composition according to claim 10 wherein said monoesters constitute from 20 to 99 weight percent of said ester composition.

12. A composition according to claim 8 wherein X and a portion of Y are identical and are selected from the group consisting of —OCH$_2$CH$_2$OCH$_2$CH$_2$O— and OCH$_2$CH(CH$_3$)CH$_2$O—.

13. A composition according to claim 12 wherein X and Y are —O(CH$_2$CH$_2$O)$_n$— and said composition additionally comprises a mixture of the mono- and dibenzoates of dipropylene glycol.

14. A composition according to claim 12 wherein both X and Y are —OCH$_2$CH(CH$_3$)CH$_2$O—.

15. A composition according to claim 8 wherein R$^1$ is phenyl.

16. A composition according to claim 8 wherein said polymer is present as an aqueous dispersion, an aqueous emulsion, a dispersion in a non-aqueous liquid, a solid or a molten material.

17. A polymer composition comprising
   A. an organic polymer and
   B. an amount sufficient to plasticize said polymer of an ester composition that is a liquid at 28° C. and comprises:

at least one monoester represented by the formula $HXC(O)R^1$ and at least one diester represented by the formula $R^1(O)CYC(O)R^1$, wherein X and Y are individually selected from the group consisting of —$[OCH_2CH_2]_pO$— and —$OR^2O$—, said diester is a solid at 28° C., $R^1$ is phenyl or substituted phenyl, wherein the substituent is selected from the group consisting of alkyl radicals containing from 1 to 4 carbon atoms and halogen, $R^2$ is selected from the group consisting of linear alkylene containing 3 or 4 carbon atoms, —$CH_2CH(CH_3)CH_2$— and —$CH_2C(CH_3)_2CH_2$—;

p is 1, 2 or 3, and wherein said composition is a liquid at 28° C. and said polymer is present as an aqueous emulsion, a non-aqueous dispersion, a non-aqueous solution, or a molten material.

* * * * *